United States Patent [19]

Raynolds et al.

[11] Patent Number: 5,919,716
[45] Date of Patent: Jul. 6, 1999

[54] SELF-CROSSLINKING AQUEOUS DISPERSIONS

[75] Inventors: Peter Webb Raynolds; Duane Allan Scott, both of Kingsport, Tenn.

[73] Assignee: Eastman Chemical Company, Kingsport, Tenn.

[21] Appl. No.: 09/132,165

[22] Filed: Aug. 10, 1998

Related U.S. Application Data

[62] Division of application No. 08/896,240, Jul. 17, 1997, Pat. No. 5,869,589
[60] Provisional application No. 60/025,277, Sep. 18, 1996.

[51] Int. Cl.⁶ .................................................. B32B 5/02
[52] U.S. Cl. ........................ 442/154; 442/155; 442/164; 442/170; 442/171; 442/173; 442/178; 442/179; 442/180; 427/389.9
[58] Field of Search ..................................... 442/154, 155, 442/164, 170, 171, 173, 178, 179, 180; 427/389.9

[56] References Cited

U.S. PATENT DOCUMENTS

| | | | |
|---|---|---|---|
| 3,203,918 | 8/1965 | Goldberg et al. | 260/29.6 |
| 3,208,963 | 9/1965 | Jasinski | 260/29.6 |
| 3,597,313 | 8/1971 | Williams et al. | 162/167 |
| 4,382,984 | 5/1983 | Martinez . | |
| 4,544,609 | 10/1985 | Hui . | |
| 4,605,702 | 8/1986 | Guerro . | |
| 4,652,603 | 3/1987 | Biale | 524/547 |
| 4,695,606 | 9/1987 | Floyd et al. | 525/160 |
| 5,026,746 | 6/1991 | Floyd et al. | 524/50 |
| 5,116,890 | 5/1992 | Floyd et al. | 524/50 |
| 5,179,150 | 1/1993 | Furman, Jr. et al. | 524/376 |
| 5,470,918 | 11/1995 | Tsutumi . | |
| 5,548,032 | 8/1996 | Tokumaga . | |

FOREIGN PATENT DOCUMENTS

| | | |
|---|---|---|
| 0 678 528 | 10/1995 | European Pat. Off. . |
| 1 217 053 | 5/1960 | France . |
| 2 027 748 | 10/1970 | France . |
| 16 69 033 | 10/1970 | Germany . |
| 27 49 691 | 5/1979 | Germany . |

OTHER PUBLICATIONS

"Reagent for Improving Dimensional Stability of Paper"; Abstract Bulletin of the Institute of Paper Chemistry, vol. 54, No. 9, Mar. 1984, Appleton, Wisconsin USA. p. 1092XP002052003.

*Primary Examiner*—Christopher Raimund
*Attorney, Agent, or Firm*—Rose M. Allen; Harry J. Gwinnell

[57] ABSTRACT

The present invention is directed to polymer compositions containing a vinyl polymer component (A), formed by polymerization of $\alpha,\beta$-ethylenically unsaturated monomers, one which contains at least one hydroxyl group and one which contains no hydroxyl groups; a crosslinker component (B); an additive component (C); and a solvent component (D). The composition is useful for backcoating woven substrates and as a binder composition for non-woven substrates.

4 Claims, No Drawings

SELF-CROSSLINKING AQUEOUS DISPERSIONS

This is a divisional application of application Ser. No. 08/896,240, filed Jul. 17, 1997, now U.S. Pat. No. 5,869,589. This application claims the benefit of U.S. Provisional Appln. No. 60/025,277 filed Sep. 18, 1996.

FIELD OF THE INVENTION

This invention relates to self-crosslinking polymer compositions. The self-crosslinking polymers of the present invention are particularly useful as binders in backcoating textile or non-woven fabrics and as adhesives. When a substrate is coated or impregnated with the self-crosslinking polymers of the present invention the strength of the substrate is enhanced while its flexibility and softness are retained.

DESCRIPTION OF THE RELATED ART

It is known to those skilled in the art that hydroxyl containing vinyl copolymers may be crosslinked with crosslinking agents. U.S. Pat. No. 3,208,963, discloses a method for forming a vinyl copolymer of vinyl acetate and hydroxy alkyl acrylate. The vinyl polymer of the reference is prepared in an organic solvent solution. The polymer of the reference may further be crosslinked by a crosslinking agent or catalyst, comprising hydrochloric acid, glyoxal, dimethylol ethylene urea, dimethylol urea, trimethylol melamine, trimethylol phenol, and para-toluene sulfonic acid.

U.S. Pat. No. 3,203,918, discloses a hydroxy acrylate-vinyl alcohol copolymer prepared in an organic solvent solution and subsequently converted into the form of an aqueous solution. Coatings or films are deposited from their aqueous solutions and subsequently rendered insoluble by aging, by application of heat and/or by prior formulation with a crosslinking agent. Such crosslinking agents include aldehydes such as glyoxal, and furfural aldehydes, urea type crosslinkers, melamine formaldehyde condensates, non-oxidizing inorganic acids, non-volatile organic acids, and acidic salts such as ferric chloride, chromic nitrate, etc.

U.S. Pat. No. 3,597,313, discloses a composition comprising a water-soluble polymer having a multiplicity of hydroxy substituents on the polymer chain and this polymer is then modified with cyanamide to render it cationic. The polymer may be crosslinked with glyoxal, the crosslinked thermosetting resin of the reference are then preferably adsorbed on cellulose, paper-making fibers in an aqueous dispersion, and the suspension is then formed into a wet-laid web, which improves the wet-strength of paper making products.

U.S. Pat. No. 4,652,603, discloses an adhesive composition comprising vinylidene chloride, a polar monomer having one or more hydroxyl groups and, optionally, a plasticizing monomer for vinylidene chloride in combination with a crosslinking agent for the hydroxyl group; the composition of the reference may be crosslinked with glyoxal. Such adhesive compositions are useful for laminating hydrophobic films, to non-hydrophobic films or other hydrophobic films or substrates so as to provide laminated structures having good oxygen and moisture vapor paper properties.

U.S. Pat. No. 5,116,890, discloses a non-formaldehyde, self-crosslinking latex which upon drying and curing provides a film having good tensile, elongation, water resistance and antiwicking properties. The latex is prepared by reacting in aqueous suspension or slurry of a starch-polymer graft with a glyoxal compound. The latex of the reference provides a system which is compatible with an acrylic latex and provides a non-formaldehyde self-crosslinking resin with tensile strength equivalent to an all acrylic binder system, but exhibiting less elongation and good water resistance.

U.S. Pat. No. 4,695,606, discloses a coating binder additive encompassing a blocked glyoxal resin mixed with a vinyl or acrylic water soluble polymer which is reactive with free glyoxal. Thus, the glyoxal resin component of the reference is blocked to inhibit it from reacting with the other components of the paper coating composition prior to curing. The curing process unblocks the glyoxal and the resin allowing them to react with the binder and polymer resulting in a crosslinked binder with superior strength and improve printing properties.

U.S. Pat. No. 5,179,150, refers to an improved creping composition comprising glyoxylated vinyl amide polymers in combination with polyvinyl alcohol. The glyoxylated-vinyl amide and the polyvinyl alcohol compositions of the reference are used in a mixture in applications for paper manufacture.

It is well known to those skilled in the art that crosslinking a polymer results in increased strength and glass transition temperature (Tg) of the polymer; and that crosslinking also decreases solubility and increases hardness and stiffness of the polymer. Soft polymeric binders of low Tg are relatively weak, while polymeric materials of high Tg provide back-coated fabrics that are stiff and esthetically unpleasant.

There exists a need for self-crosslinking polymer compositions which provide a substrate with strength, good draping, flexibility and pleasing feeling.

There also exists a need for a method to treat substrates with polymer compositions in order to enhance the strength of the substrate while providing additional properties such as good draping, flexibility, and pleasing feeling to touch.

SUMMARY OF THE INVENTION

Applicants have discovered novel self-crosslinking polymer compositions and a novel method for treating substrates with these self-crosslinking polymer compositions. A substrate, after treatment with the self-crosslinking polymer compositions of the present invention, exhibits the combined properties of strength, softness and flexibility. It would be expected that crosslinking of a polymer decreases solubility, increases strength, and decreases softness and flexibility. Crosslinking of a polymer is normally associated with increased toughness and brittleness. The discovery that a self-crosslinking polymer, when applied as a binder on a substrate, provides the substrate with combined softness, flexibility and strength is both unexpected and desirable.

It is an object of the present invention to provide self-crosslinking polymer compositions which are stable when stored as a one-package system and are suitable for use in backcoating formulations applied to various substrates.

It is another object of the present invention to provide a method of treating substrates with self-crosslinking polymer compositions and to provide those substrates with a combination of softness and strength properties.

It is a further object to provide self-crosslinking polymer compositions which are able to crosslink without the use of toxic reagents; and which crosslink, optionally, without added catalyst or heat.

BRIEF DESCRIPTION OF THE DRAWING

FIG. 1 depicts the change in elongation of a polymer of the present invention compared to commercial polymer materials.

DESCRIPTION OF THE PREFERRED EMBODIMENTS

The present invention provides self-crosslinking polymer compositions useful as textile backcoating formulations and having other textile applications. The polymer compositions encompass: (A) a vinyl polymer component, present in an amount of from 20 to 65 weight percent, based on the total amount of the polymer composition. The vinyl polymer is formed by copolymerizing: (a) at least one first $\alpha,\beta$-ethylenically unsaturated monomer which contains at least one hydroxyl group, present in an amount from 2.0 to 25.0 weight percent based on the total amount of copolymerizable monomers; and (b) a second $\alpha,\beta$-ethylenically unsaturated monomer which contains no hydroxyl groups, present in an amount from 75.0 to 98.0 weight percent, based on the total amount of copolymerizable monomers. The second $\alpha,\beta$-ethylenically unsaturated monomer preferably contains: (i) an alkyl (meth)acrylate ester, and may include (ii) optionally, a styrenic monomer, (iii) optionally, a (meth)acrylamide monomer, (iv) optionally, a (meth)acrylonitrile monomer, (v) optionally, an additional copolymerizable monomer, and (vi) optionally, a copolymerizable crosslinkable monomer.

Further, the polymer composition contains (B) a crosslinker component, present in an amount of from 0.1 to 15.0 weight percent based on the total amount of component (A). In addition, the polymer composition may contain (C) an optional additive component, present in an amount of up to 2.0 weight percent, based on the total amount of component (A); and (D) a solvent component being the remainder of the polymer composition.

COMPONENT (A)—Vinyl Polymer

Vinyl polymers in accordance with the present invention are the polymerization product of the following monomers:
Component (a)

Component (a) contains at least one first copolymerizable $\alpha,\beta$-ethylenically unsaturated monomer containing at least one hydroxyl group. Component (a) is present in an amount of from 2.0 to 25.0 weight percent, based on the total amount of copolymerizable monomers. A preferred amount is from 3.0 to 15.0 weight percent, and a more preferred amount is from 4.0 to 10.0 weight percent, all based on the total amount of monomers.

Preferred examples of hydroxyl containing monomers are, but are not limited to, 2-hydroxyethyl (meth)acrylate, 4-hydroxybutyl (meth)acrylate and hydroxypropyl (meth)acrylate. A more preferred monomer in accordance with the present invention is 2-hydroxy-ethyl acrylate. he term "(meth)acrylate" as used herein denotes either methacrylate or acrylate.
Component (b)

Component (b) is a second copolymerizable $\alpha,\beta$-ethylenically unsaturated monomer which contains no hydroxyl groups, present in an amount of from 75.0 to 98.0 weight percent, based on the total amount of copolymerizable monomers. Preferably, component (b) contains:

Component (i). Component (i) is preferably an $\alpha,\beta$-ethylenically unsaturated monomer which may be represented by the general formula:

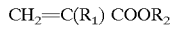

$$CH_2=C(R_1)\,COOR_2$$

where $R_1$ is hydrogen or a $C_1$–$C_3$ alkyl group, and $R_2$ is a $C_1$–$C_{20}$ alkyl group, phenyl, benzyl, $C_1$–$C_4$ alkoxy-($C_1$–$C_4$) alkyl, cyclopentyl, hydroxy-($C_1$–$C_4$)-alkyl, cyclohexyl, furyl, $C_1$–$C_4$ alkyl furyl, tetrahydrofuryl, $C_1$–$C_4$ alkyl tetrahydrofuryl and combinations of these monomers thereof. Combinations of monomers where $R_1$ is hydrogen and monomers wherein $R_1$ is an alkyl group may be used to modify the glass transition temperature of the vinyl polymer. Preferred examples of useful monomers are, but are not limited to, $C_1$–$C_{18}$ alkyl (meth)acrylates such as, methyl (meth)acrylate, ethyl (meth)acrylate, propyl (meth)acrylate, isopropyl (meth)acrylate, butyl (meth)acrylate, isobutyl (meth)acrylate, hexyl (meth)acrylate, isooctyl (meth)acrylate, isodecyl (meth)acrylate, lauryl (meth)acrylate, stearyl (meth)acrylate, phenoxyethyl (meth)acrylate, methoxyethyl (meth)acrylate, benzyl (meth)acrylate, ethoxyethyl (meth)acrylate, 2-ethylhexyl (meth)acrylate, cyclopentyl (meth)acrylate and isobornyl (meth)acrylate, as well as combinations of those monomers. The term "alkyl" is used to denote straight chain or branched alkyl groups.

combination of these monomers may be used in order to achieve an appropriate Tg for the resulting vinyl polymer (A). Preferred monomers are butyl acrylate and methyl methacrylate. Component (i) may be present in the vinyl polymer (A) in an amount of from 40.0 to 98.0 weight percent, based on the total amount of monomers. However, a preferred amount is of from 50.0 to 98.0 weight percent and a more preferred amount is 70.0 to 98.0 weight percent, based on the total amount of monomers.

Component (ii). Optionally, component (b) may contain up to 40 weight percent of a styrenic monomer, based on the total amount of monomers. The term styrenic monomer denotes styrene, or a substituted styrene such as $C_1$–$C_6$ alkyl ring-substituted styrene, $C_1$–$C_3$ alkyl $\alpha$-substituted styrene or a combination of ring and $\alpha$-alkyl substituted styrene. Preferred styrenic copolymerizable monomers include styrene, p-methyl styrene, m-methyl styrene, o-methyl styrene, p-butyl styrene, $\alpha$-methyl styrene and combinations thereof. More preferred are styrene, p-methyl styrene, m-methyl styrene, and $\alpha$-methyl styrene. A preferred amount of the styrenic monomer is from 3.0 to about 25.0 weight percent. A more preferred amount of styrenic monomer is from 4.0 to about 15.0 weight percent, based on the total amount of monomers.

Component (iii). Optionally, component (b) may contain up to 10.0 weight percent of (meth)acrylamide based on the total amount of monomers. A preferred amount of component (iii) is up to 7.0 weight percent; a more preferred amount is up to 4.0 weight percent, based on the total amount of monomers.

Component (iv). Optionally component (b) may contain up to 20.0 weight percent, based on the total amount of monomers, of (meth)acrylonitrile. A preferred amount of component (iv) is 1.0 to 10.0 weight percent. A more preferred amount of component (iv) is 2.0 to 6.0 weight percent, based on the total amount of monomers.

Component (v). Optionally, component (b) may contain an additional copolymerizable monomer in an amount of up to 20.0 weight percent, based on the total amount of monomers. Such monomers may be selected from acid functional monomers, such as (meth)acrylic acid, crotonic acid, itaconic acid, maleic acid, fumaric acid, 2-acrylamido-2-methyl-1-propanesulfonic acid; sodium or potassium salts of the above acids; anhydrides of the above acids; vinyl esters, such as vinyl acetate, vinyl propionate, vinyl 2-ethylhexanoate, vinyl neononanoate vinyl neodecanoate and vinyl formate; castor oil; and copolymerizable monoglyceride, diglyceride and triglyceride. Preferred monomers include monoglyceride, diglyceride and triglyceride.

Component (vi). Optionally, component (b) may contain up to 2 weight percent, based on the total amount of copolymerizable monomers, of a copolymerizable crosslinkable monomer. Useful crosslinkable monomers may be selected from trimethylolpropane; tri(meth)acrylate; 1,6-hexanediol di(meth)acrylate; allyl (meth)acrylate; divinyl benzene and the like. In a preferred composition, a copolymerizable crosslinkable monomer is added in an amount of up to 2 weight percent based on the total amount of copolymerizable monomers.

Vinyl polymer component (A), in accordance with the present invention, may be prepared as a solution or as a dispersion. In the case of a solution it is possible to utilize any solvent in which the monomers and the ultimate vinyl polymer are soluble. Such solvents include water, acetone, methylethyl-ketone, ethylacetate, various alcohols and mixtures thereof In a preferred embodiment an aqueous dispersion of vinyl polymer component (A) is formed. In accordance with this embodiment, a conventional surfactant or combination of surfactants can be used such as anionic surfactants including, but not limited to, a fatty acid, alkali or ammonium alkylsulfate, alkylsulfonate, alkylarylsulfate, sulfated polyethoxylated alkyl phenol, sulfosuccinate, alkali or ammonium alkylphosphate; or non-ionic surfactants, such as polyoxylated fatty alcohol, polyethoxylated alkyl phenol, polyethoxylated fatty acid. Surfactants may be used in an amount up to 6.0 weight percent, based on the total weight of the monomers. Preferred surfactants are sodium dodecyl benzene sulfonate, sodium dodecyl sulfate or a diester of sodium sulfosuccinic acid such as dioctylsulfosuccinate Typical emulsion initiators may be used in accordance with known aqueous dispersion polymerization procedures. Such initiators include peroxygen compounds such as hydrogen peroxide; sodium, potassium or ammonium persulfate; t-butyl hydroperoxide; cumene hydroperoxide; lauryl peroxide; benzoyl peroxide or persulfate compounds. A preferred amount of an initiator, in accordance with the present invention, is between 0.05 and 1.5 weight percent, based on the total weight of the monomers. In addition, redox initiators may be used including, but not limited to, combinations of peroxygen compounds with sodium formaldehyde sulfoxylate, isoascorbic acid, or divalent iron salts. The preferred amount of redox initiator is 0.02–1.5 weight percent, based on the total weight of the monomer. The term "dispersion polymerization" is used to denote suspension or emulsion polymerization.

Emulsion polymerization is a more preferred embodiment. The reaction temperature of an emulsion polymerization process is determined by the type of initiator. Accordingly, the reaction temperature may range from about 20° C. to 90° C.; with a preferred reaction temperature being between 60° C. and 85° C. In addition, a chain transfer agent may be used to regulate the molecular weight of the vinyl polymer. Examples of chain transfer agents include, but are not limited to, mercaptans such as dodecylmercaptan, t-butyl mercaptan, 2-ethylhexyl-3-mercapto propionate; and haloalkyl compounds such as carbon tetrabromide and bromodichloromethane, as well as mixtures thereof.

Further, a wet adhesion promoting comonomer may be added to the emulsion polymerization process. Examples of wet adhesion promoting monomers include t-butylaminoethyl methacrylate, dimethylaminoethyl methacrylate, diethylaminoethyl methacrylate, N,N-dimethylaminopropyl methacrylate, 2-t-butylaminoethyl methacrylate, N,N-dimethylaminoethyl acrylate, and N-(2-methacryloxy-ethyl) ethylene urea.

A batch process or a semi-continuous process may also be used to form the vinyl polymer component (A). A semi-continuous process represents another preferred embodiment. In a preferred semi-continuous process, 1.0 to 5.0 weight percent of a mixture of one or more monomers, from components (a) and (b), based on the total amount of monomers, is introduced into the polymerization vessel together with a polymerization initiator and, optionally, a surfactant. Subsequently, the temperature is raised to the reaction temperature and polymerization is initiated to produce a seed. The remainder of the mixture of monomers along with a polymerization initiator may then be incrementally added to the aqueous dispersion of the seed and polymerized to produce an aqueous vinyl polymer. It is desirable to have less than 100 parts per million (ppm) of unsaturated monomers in the final product and preferably less than 50 ppm unsaturated monomer (s). The aqueous dispersion thus produced can be prepared with a total solids content of from about 20% to about 65%. It is preferred, for safety reasons, that the initiator not be mixed with the monomers but added separately, although concurrently.

In a preferred embodiment of a semi-continuous process, a sequential addition of at least two monomer mixtures, differing in glass transition temperatures (Tg), is used. The term glass transition temperature of a monomer mixture means the Tg of a polymer derived from the polymerization of the monomer mixture. The Tg of the vinyl polymer may be adjusted depending on the requirement of the final use of the polymer composition. For example, for a woven binder substrate the vinyl polymer may preferably have a Tg of from −50 to 15° C. A preferred Tg is between −35 to 0° C. and a more preferred Tg is between −30 to −10° C. However, a preferred Tg for a non-woven binder substrate is from −30 to 40° C., with −15 to 20° C. being a more preferred Tg.

The vinyl polymer of the present invention preferably has a weight average molecular weight (Mw) from 50,000 to 8,000,000; more preferably from 100,000 to 2,000,000; a most preferred Mw is 200,000 to 1,000,000, as measured by gel permeation chromatography (GPC).

In a preferred embodiment, where the vinyl polymer is in the form of a dispersion, the particle size of the dispersion may be from 50 to 600 nm. A preferred particle size for the dispersion is between 100 and 500 nm; and a more preferred particle size is 160 to 350 nm. The polymer particles generally have a spherical shape. In a preferred embodiment, the spherical polymer particles have a core portion and a shell portion or gradient structure. The core/shell polymer particles may also be prepared in multi-lobe forms, a peanut shell, an acorn form, a raspberry form or any other form as is known in the art.

COMPONENT (B)—Crosslinker

In the self-crosslinking polymer composition in accordance with the present invention, a crosslinker component is used in an amount of 0.1 to 15 weight percent, based on the total amount of vinyl polymer component (A). A preferred amount of a crosslinker is from 1.0 to about 6.0 weight percent; and a more preferred amount is of from 2.0 to about 4.0%, based on the total amount of component (A). A preferred crosslinker is a dialdehyde having the general formula $CHO(CH_2)_nCHO$, wherein n is an integer of 1 to 8. In addition, cyclic compounds such as dialdehydes are furaldehyde; 2,5-dialkoxy-2,5-dihydrofuran; 2,5-dialkoxytetrahydrofuran; 3,4-dihydro-2-ethoxy-2H-pyran may also be used as component (B). Further, aldehyde-alcohols and equivalents such as 2,3-dihydrofuran; 3,4-dihydro-2H-pyran may also be used as component (B). In addition formaldehyde or formaldehyde-melamine resins may be used as component (B).

More preferred crosslinkers are glyoxals, either free or blocked. Suitable blocked glyoxal resins which may be used are described in U.S. Pat. No. 4,695,606, incorporated herein by reference. However, the more preferred form of glyoxal is free glyoxal. Glyoxal may be added during the polymerization of the monomers for component (A) above or after the polymerization is complete.

Although applicants do not wish to be bound by any theories, it is believed that glyoxal does not enter into an irreversible reaction with the vinyl polymer or any of the monomers in the presence of water. Glyoxal may however enter into reversible combinations with alcohols via the formation of an acetal or with water to form hydrates. Glyoxal may also crosslink with hydroxyl as well as amide pendant functionalities present on the vinyl polymer backbone, in addition to self crosslinking. Thus, the amount of glyoxal required in accordance with the present invention will depend on the amount of the combined hydroxyl and amide pendant functionality on the polymer backbone as well as the desired properties.

Alternatively, the amount of glyoxal can be expressed as a ratio obtained by dividing the moles of glyoxal by the total number of moles of hydroxyl and amide moieties on the polymer backbone. The amount of glyoxal so expressed may vary from 0.02 to 4.0. Preferably the amount of glyoxal may vary from 0.1 to 2.5, and most preferably from 0.2 to 1.0.

In a preferred embodiment, glyoxal is used as a 40 weight percent aqueous solution. However, glyoxal may be used in any form, such as a pure crystalline form. In addition glyoxal may be in the form of a dimer, trimer or polymer. Generally, a monomeric glyoxal can reversibly be formed from the above forms. Thus, any of the above forms of glyoxal can be used as a source of monomeric glyoxal in accordance with the present invention. The above forms of glyoxal are discussed in U.S. Pat. No. 4,191,643, incorporated herein by reference.

In a preferred embodiment glyoxal is used in combination with diols such as ethylene glycol, 1,6-hexanediol, diethylene glycol, propylene glycol, neopentyl glycol, 1,4-cyclohexane dimethanol, 1,3-cyclohexane dimethanol, glycerin, pentaerythritol, sugar, polyvinyl alcohol; carbamates, such as N,N-bis(2-hydroxyethyl)-2-hydroxyethylcarbamate; mono-, di-, or tri-glycerides with a hydroxyl value of at least 200 mg KOH per gram of the vinyl polymer; urea and substituted urea; castor oil; or an amine-alcohol. The amount of the additive, other than glyoxal, may range from 10 mol percent to 500 mol percent based on the amount of glyoxal. A more preferred amount is 50 mol percent to 200 mol percent based on the amount of glyoxal.

COMPONENT (C)—Additive

Optionally, an additive component may be included as component (C) in an amount up to 2.0 weight percent, based on the amount of component (A). Such additives include fillers, fire retardants, foaming agents, oils, plasticizers, opacifiers, thickeners, optical brighteners, surface active agents, catalysts, biocides, or other ingredients to provide desired end-use properties.

Suitable catalysts for accelerating the rate of reaction of Component (A) with Component (B) include, for example, inorganic and organic salts of magnesium and aluminum; oxalic acid; citric acid; and aluminum nitrate.

In a preferred embodiment, additive component (C) is a foaming agent selected from monoglyceride, diglyceride and triglyceride. Monoglyceride is a preferred foaming agent for textile foam finishing applications such as back-coating.

COMPONENT (D)—Solvent

The remainder of the self-crosslinking polymer composition is a solvent component. Useful solvents may be selected from water, acetone, methylethyl ketone, cellosolve acetate, alcohol, and mixtures thereof. Water is a preferred solvent; however, combinations of water and other solvents may also be used.

A desired property of the present invention is that self-crosslinking polymer compositions comprising components (A), (B), (C) and (D) as described above, are stable for prolonged periods during storage, yet crosslink when applied to a substrate. Thus, the present composition is stable as a "one-package" system. The term "one-package" system, as used herein, denotes that the reactive components of the composition, the hydroxyl containing vinyl polymer, component (A), and the crosslinker, component (B), are packaged together in the same container; as opposed to a "two-package" system where the crosslinkable polymer is in a separate package from the crosslinking agent.

The "one-package" system of the present invention is "storage stable" at ambient temperatures, meaning the self-crosslinking polymer composition remains remains substantially uncrosslinked during storage over prolonged periods of time, up to about one year. At elevated temperatures, such as at 50° C., the self-crosslinking polymer compositions are stable for up to about four weeks.

Although applicants do not wish to be bound by any theories, it is believed that the storage stability of the crosslinker component (B) is important in the presence of an excess of water. It is believed that the crosslinker, especially when glyoxal is used as crosslinker, exists as a hydrated moiety such as 1,1,2,2-tetrahydroxy ethane Commonly used commercial crosslinking systems typically employ special techniques to prevent premature crosslinking, such as the two-package system described above. These systems require the combination of the crosslinkable polymer with a crosslinker or catalyst immediately before use. Although such technology is widely used and gives good results, the ingredients have to be accurately measured and thoroughly blended immediately before application of the mixture. Another way to prevent premature self-crosslinking is to use an acid-catalyzed crosslinking system which is neutralized with ammonia to a pH of about 8. Upon drying, ammonia is liberated, the system becomes acidic and the acid-catalyzed crosslinking reaction can occur. However, the evolution of ammonia in the atmosphere during application of the coating presents environmental and worker exposure concerns.

The self-crosslinking polymer compositions of the present invention are able to self-crosslink without the use of toxic reagents such as formaldehyde. This is particularly important with recent legislation addressing environmental concerns in some states requiring control of emission and worker exposure to volatile toxic materials.

Further, the self-crosslinking polymer compositions of the present invention crosslink without any added catalyst or heat. Films formed from polymers of the present invention and dried at ambient conditions, have substantially the same tensile properties as commercial polymers cured at elevated temperatures, such as 120° C. The low curing temperature of the self-crosslinking polymer compositions of the present invention enable the use of these polymers in backcoating formulations used on heat sensitive materials such as polypropylene, which melt at normal thermal crosslinking temperatures used for curing commercially backcoating materials (greater than 120° C.). The low curing temperature also reduces curing time and increases production speeds in commercial operations. Optionally, catalysts or elevated temperature may be employed to accelerate or increase the extent of crosslinking if desired.

Further, the present self-crosslinking polymer compositions provide polymers with good distortion resistance and dimensional stability while maintaining flexibility.

In a preferred embodiment of the present invention, a backcoating or binder formulation is formed by blending: vinyl polymer component (A) as described above, present in an amount of from 10 to 65 weight percent, based on the total amount of the backcoating formulation; a crosslinker component (B) as described above, present in an amount of from 0.1 to 15.0 weight percent, based on the total amount of component (A); and an additive component (C), as described above, present in an amount of up to 2.0 weight percent, based on the total amount of component (A). The backcoating or binder formulation further contains an associative thickener component (E), present in an amount of from 0.5 to 10.0 weight percent, based on the total amount of the backcoating formulation; optionally, a surfactant component (F), present in an amount up to 10.0 weight percent based on the total amount of the backcoating formulation; optionally, a plasticizer component (G), present in an amount up to 10.0 weight percent, based on the total amount of the backcoating formulation; and optionally, a filler component (H), present in an amount up to 25 weight percent based on the total amount of components (A), (B), (C), (E), (F) and (G). Again, the remainder of the backcoating formulation is a solvent component (D).

Associative thickeners useful as component (E) are described in the treatise: "Handbook of Coatings and Additives" Volume 2, J. Calb Editor, "Associative Thickeners", E. J. Schaller and P. R. Sperry, Marcel Dekker, Inc., New York, 1992. Additionally, U.S. Pat. No. 4,722,962, incorporated herein by reference, describes associative thickeners useful in the practice of the present invention. Such associative thickeners include ACRYSOL RM-825 available from Cytec Chemical Company. Commercial alkali-swellable thickeners commonly used for these applications achieve optimal viscosity increase at a pH of 9.0. However, glyoxal, a preferred crosslinker component (B) of the present invention, is unstable at that pH. Applicants have discovered that non-ionic associative thickeners are preferred as component (E) when used in combination with glyoxal at a preferred pH of less than 8.0.

Specific examples of surfactants useful as optional component (F) may be found in the treatise: "McCutcheon's Emulsifiers and Surfactants", M. C. Publishing Co., Greenrock, N.J., 1993.

In addition, a plasticizer, optional component (G), may be added to the backcoating formulations. Examples of useful plasticizers include, but are not limited to, oil, adipic esters, phthalate esters, isobutyrate esters, terephthalate esters, epoxidized butyl esters or fatty acids, epoxidized vegetable oils and polymeric plasticizers. More preferred plasticizers in accordance with the present invention are, vegetable oil, di-2-ethylhexyladipate or dioctyladipate (DOA), di-2-ethylhexylphthalate or dioctylphthalate (DOP), di-2-ethylhexyl terephthalate (DOTP), dicyclohexylphthalate, diisononyladipate, diisononylphthalate, n-butylbenzylphthalate, 1,3-butylene glycol/adipic acid polyester, dialkyl adipate, dialkyl phthalate derivatives where the alkyl group is a $C_1$–$C_{12}$ alkyl group, preferably a $C_7$, $C_9$ or $C_{12}$ alkyl group, di-n-hexylazelate, diphenylphthalate, tricresol phosphate, benzyl benzoate, dibutyl phosphate, tributyl phosphate, tributoxyethyl phosphate, triphenyl phosphate, butyl acetyl ricinoleate, glycerol acetyl ricinoleate, dibutyl phthalate, diethyl phthalate, dioctyl phthalate, dimethoxyethyl phthalate, diisobutyl phthalate, diamyl phthalate, dibutyl glycolate, butyl stearate, triethyl citrate, tributyl citrate, tributyl acetyl citrate, 2-hexyltriethylacetyl citrate, dibutyl tartarate, camphore, epoxidized butyl esters of linseed oil fatty acids, epoxidized linseed oil, epoxidized soya oil, propylene glycol adipate, 2,2,4-trimethyl-1,3-pentanediol diisobutyrate, methylabietate, cumyl acetate, dibutoxyethyl adipate, di-n-hexylazalate, glyceryl-tribenzerate, tri-n-butylcitrate, dioctyl-fumarate, triisonyltrimellitate, dioctylisophthalate, butyloleate, chlorinated parafin, tricresylphosphate or dibutylsebacate.

Optionally, a filler component (H) may be added to the backcoating or binder formulations. Useful fillers may be selected from finely divided clays, silicates, aluminosilicates and other finely divided materials.

Substrates useful in the practice of the present invention may be woven or non-woven substrates. Preferred substrates are non-woven fabric substrates such as those composed of fibers of glass, quartz, graphite, KEVLAR, polyester, nylon, polypropylene, polyethylene, acetate, cotton, cellulose or blends of these fibers.

Backcoating or binder formulations of the present invention may be applied using methods known in the art such as padding or impregnating; coating or foam finishing; and other known application methods.

Obviously, numerous modifications and variations of the present invention are possible in light of the above teachings. It is therefore to be understood that within the scope of the appended Claims, the invention may be practiced otherwise than as specifically described herein.

EXAMPLES

Example 1—Latex Synthesis

The reaction was run in a 4-L jacketed kettle topped with a four-neck closure. Agitation was with two four-blade propellers. The reaction temperature was 80° C. The reactor was charged with 514 g of water, 1.4 g of anhydrous sodium carbonate, 3.4 g of sodium dodecyl benzene sulfonate (SDBS). An emulsion was made with 901 g of water, 2 g of sodium carbonate, 6.8 g of SDBS, 969 g of butyl acrylate, 595 g of styrene and 136 g of 2-hydroxyethyl acrylate (HEA). To the reactor was added 78 g of the emulsion followed by a solution of 3.5 g of sodium persulfate in 67 g of water. After 10 minutes, the emulsion was fed to the reactor over three hours. After 30 minutes, a solution of 5 g of sodium persulfate in 120 g of water was added over 90 minutes. The reaction temperature of 80° C. was maintained for one hour after the end of the addition of the emulsion. The reaction mixture was cooled to 60° C. A chaser was then added to reduce the residual monomers, as follows: 4.0 g of 0.5% aqueous ferrous sulfate solution, was added to the reactor all at once followed by 4 g of 70% t-butylhydroperoxide in 120 g of water; a solution of 4 g of sodium metabisulfite, 1 g of sodium hydroxide and 120 g of water was added over 90 minutes. The product had a particle size of 119 nm, a pH of 6.5, and 45.3% solids.

Example 2—Backcoating Latex Synthesis

The reactor, as described in Example 1, was charged with 250 g of water, 0.78 g of sodium carbonate and 256 g of the latex of Example 1. After heating to 80° C., a mixture of 3.2 g of sodium persulfate in 87 g of water was added. After 10 minutes, 91 g of a 40% mixture of glyoxal in water was added over 150 minutes. At the same time, the emulsion feed, also lasting 150 minutes, was started. The emulsion consisted of 883 g of water, 9 g of SDBS, 1365 g of butyl acrylate, 309 g of styrene and 146 g of HEA. One half hour after the emulsion feed was started, a catalyst solution consisting of 5.9 g of sodium persulfate and 156 g of water was started, and lasted 90 minutes. Heating was continued at 80° C. for one hour after the end of the emulsion. Residual monomers were reduced with the iron/peroxide/metabisulfite combination described above. The product had a particle size of 320 nm, a pH of 4.2, 51.4% solids, a viscosity of 90 cps, measured with a Brookfield viscometer, #2 spindle, at 60 rpm, and Tg −20.7° C.

To 3455 g of this latex was added 44.4 g of a 40% solution of glyoxal in water. This material and a styrene/acrylic control latex, commonly used in the textile industry in this type of application, were formulated, as described in Table I, and applied to fabric at the rate of 2.5 ounces per square yard dry add-on (91 grams per square meter). Both samples were cured for 4 minutes at 25° F. (121° C.) and evaluated.

The latex described in this example gave a backcoated fabric which was stronger, with a seam strength of 86.7 pounds per linear inch (15.5 kg/cm), than the control, at 84.5 pounds per linear inch (15.1 kg/cm).

TABLE 1

Evaluation of Example 1 Against A Standard Control Formulation

Backcoating Formulation

| Material | Control | Present Invention |
| --- | --- | --- |
| Latex | Styrene/Acrylic | Latex from Example 1 |
| Catalyst | None | None |
| Water | Water | Water |
| Filler | sodioaluminum silicate | sodioaluminum silicate |
| Soap | Soap | Fast Soap |
| Soap | Soap | None |
| Plasticizer | Oil | Oil |
| pH Adjustment | Aq. Ammonia | None |
| Thickener | Alkali Soluble (ASE) | Associative Thickener |

Q.C. Specifications

| Parameters | Control | Present Invention |
| --- | --- | --- |
| % Solids | 51.50 | 53.12 |
| Weight/Gallon (#/gal) | 8.70 | 8.70 |
| Viscosity (cps) | 7,790 | 2,640 |
| pH | 9.30 | 5.00 |

Viscosity Stability

| Control | | | Present Invention | |
| --- | --- | --- | --- | --- |
| Builds (cps) | Stir-backs (cps) | Day | Builds (cps) | Stir-backs (cps) |
| — | 7,790 | Initial | — | 2,640 |
| 8,320 | 7,920 | 1 | 2,440 | 2,280 |
| 8,100 | 7,780 | 3 | — | — |
| 7,800 | — | 7 | 2,200 | — |
| 8.040 | — | 14 | 2,160 | — |
| 7,600 | — | 21 | 2,040 | — |
| 7,760 | 7,240 | 28 | 2,000 | 2,000 |

TABLE 1-continued

Evaluation of Example 1 Against A Standard Control Formulation
Evaluation of Coated Fabric
(2.5 osy* dry add-on, 4 min. @ 250 deg. (F)

| Parameter | Control | Present Invention |
| --- | --- | --- |
| Softness of "hand": Subjective | Soft | Softer |
| Seam Strength: #/linear in. | 84.5 | 86.7 |

*osy = ounces per square yard

Example 3

The apparatus was the same as used in Example 1. The reactor was charged with 904 g of water, 0.34 g of (75% sodium dioctyl sulfosuccinate in a mixture of ethanol and water, available as AEROSOL OT surfactant from Cytec Chemical Company), 40 g of butyl acrylate and 7 g of styrene. The reactor was heated to 80° C. and a solution of 4.9 g of sodium persulfate in 67 g of water was added. After 15 minutes, the catalyst and monomer mixtures were begun simultaneously. The monomer mixture was fed over 170 minutes and consisted of 1160 g of butyl acrylate, 88 g of styrene, 158 g of methyl methacrylate, 127 g of 2-hydroxyethyl acrylate and 2.5 g of AEROSOL OT surfactant. The catalyst mixture was fed over 160 minutes and consisted of 192 g of water, 3 g of sodium dodecyl benzene sulfonate, 2 g of sodium bicarbonate and 3 g of sodium persulfate. The reaction mixture was held at 80° C. for 30 minutes and cooled to 60° C. A mixture of 2.6 g of 70% t-butylhydroperoxide in water and 58 g of water was added all at once, and a mixture of 3 g of sodium metabisulfite, 80 g of water and 40 g of a 40% solution of glyoxal in water was added over one hour. The mixture was cooled to room temperature and filtered through a 100 mesh screen.

The latex had a particle size of 245 nm in 0.01 M NaCl, a pH of 2.8, 53.05% solids, a viscosity of 118 cps, and Tg −25° C.

Example 4

A latex with the same composition as the one described in Example 3, but without glyoxal, was prepared. Various levels of glyoxal were then added to portions of the latex. One percent glyoxal means one gram of pure glyoxal per 100 g of dry polymer. The tensile strength, gel fraction and swell ratio of thin (10 mil, 0.25 mm) films of the air-dried latex (no catalyst, no heat above room temperature) were determined.

Gel fraction was determined by soaking an accurately weighed 10 mil (0.25 mm) film in acetone for at least 16 hours. The mixture was filtered through a 100 mesh screen. The weight of polymer retained on the 100 mesh screen was determined after drying in a 120° C. oven for at least four hours. The gel fraction is the weight of oven-dried polymer retained on the 100 mesh screen divided by the original dry weight. The original dry weight is defined as the actual weight of the sample minus the weight of volatile matter. Volatile matter was determined by drying a separate sample in a 120° C. oven for at least six hours.

Swell ratio was determined by soaking an accurately weighed 10 mil (0.25 mm) film in acetone for at least 16 hours. The weight of the acetone-wet polymer was determined. The swell ratio is the weight of the polymer swollen with acetone divided by the original dry weight, as defined above.

Tensile strength was determined according to ASTM D 882. The dry film thickness was approximately 8–10 mils (0.20 to 0.2.5 mm). Samples were air dried in the laboratory for a day, followed by at least two days in a constant temperature-humidity room held at 22° C. and 50% relative humidity. The reported value is the average of ten. The results are shown below in Table II.

TABLE II

| Percent Glyoxal | Percent Volatile | Tensile Strength kg/cm | Gel Fraction | Swell Ratio |
|---|---|---|---|---|
| 0 | 1.18 | 3.0* | 0.35 | —** |
| 0.5 | 1.60 | 10.1 | 0.48 | —** |
| 1 | 2.11 | 18.3 | 0.71 | 14.3 |
| 2 | 3.04 | 38.7 | 0.86 | 6.9 |
| 3 | 4.12 | 39.2 | 0.89 | 5.3 |
| 4 | 5.13 | 52.4 | 0.90 | 4.4 |
| 5 | 6.41 | 61.8 | 0.91 | 4.0 |

*This sample was weak and difficult to handle; only two measurements were done as opposed to ten for the other samples.
**Could not be determined.

Example 5: Flexibility Measurements

Each sample was a 40×10 mm free film prepared from the latex of Example 4 with 2% glyoxal, and from commercial latexes available from Rohm and Haas. Exactly 20 mm of the sample was allowed to dangle unsupported. After 22 hours, the angle of repose was calculated from measurements of the distance of the end of the sample from the vertical plane, and from the supporting horizontal surface. The angle of repose is defined as the angle formed by the vertical surface, the square horizontal edge and the end of the polymer sample. A low value indicates a soft, flexible material. The data, shown in Table III below, demonstrates the stronger-yet-softer property of the polymer compositions of the present invention.

TABLE III

| Sample | Angle of Repose (from the vertical) | Thickness, mm | Tensile Strength, kg/cm$^2$ (psi) |
|---|---|---|---|
| Latex of Example 3 with 2% glyoxal | 11.3° | 0.392 | 38.7 (551) |
| Rohm and Haas NW-1845 latex | 14.5° | 0.406 | 17.1 (243) |

Example 6: A Formulated Backcoating Mixture (a) Preparation of a crosslinking latex. A latex with the same composition as the one described in Example 3, but without glyoxal, was prepared. Glyoxal, as a 40% solution in water, was added at the rate of 3 g of pure glyoxal per 100 g of dry polymer weight. The latex was 52.2% solids.

(b) Preparation of a backcoating mixture: Sodium dodecyl sulfate (6 g) was dissolved in 100 g of water. To this was added, with moderate stirring, 190.5 g of the latex described in (a), 100 g of powdered sodium aluminum silicate, 25 g of soybean oil and 5.7 g of ACRYSOL® RM-825 thickener (available from Cytec Chemical Company).

(c) Foaming the mixture: The mixture described in (b) was blended with a heavy-duty KITCHENAID blender equipped with a wire whisk for two minutes. The resulting foam had a density of 0.13 grams per milliliter, and was stable for at least one hour.

(d) Viscosity stability of the backcoating mixture: In a manner similar to (b), a backcoating mixture was prepared from 100 g of water, 7 g of sodium dodecyl sulfate, 190.5 g of the latex described in (a), 100 g of powdered sodium aluminum silicate, 25 g of soybean oil and 23.5 g of ACRYSOL® RM-825 thickener. This mixture was not foamed. The viscosity of the mixture was 5660 cps, measured with a Brookfield viscometer, #3 spindle, at 12 rpm. After 34 days, the viscosity was 5780 cps.

Example 7

A mixture of 100 g of water, 4 g of MYVATEX TEXTURE LITE emulsifier (available Eastman Chemical Company), a mixture of glycerol monostearate, propylene glycol monostearate, and sodium stearoyl lactylate), 194 g of a latex (51.6% solids) with the same composition as the latex of Example 1, 100 g of powdered sodium aluminum silicate and 25 g of soybean oil was blended until homogenous and then foamed as described in Example 6. The foam had a density of 0.24 g per milliliter.

Example 8

A copolymer latex consisting of 76% butyl acrylate, 14% methyl methacrylate, 2% styrene, 8% 2-hydroxyethyl acrylate was prepared by a procedure similar to Example 3. The particle diameter was 319 nm and the glass transition temperature was −25° C. Glyoxal was added at the rate of 2 grams per 100 g of dry polymer. The tensile properties of a free film of the unformulated latex, never heated above room temperature, is shown in FIG. 1. Commercial latexes, from Rohm and Haas, NW-1845, uncured, and E-2780, heated at 120° C. for 2 minutes, were analyzed in a similar fashion. FIG. 1 shows that the present invention provides a stronger product with a higher modulus.

Example 9—Use of Crosslinking Latex as a Non-woven Binder

A fiberglass substrate, obtained from CEM Corporation, was cut to a thickness of 0.35 mm, padded (impregnated) with the two latexes described in Example 6 (a) above, dried overnight and then stored at 22° C. and 50% relative humidity for three days. The results are shown in Table IV below.

TABLE IV

| Description | Application Rate | Tensile Strength |
|---|---|---|
| Untreated | 0 | 6.5 kg/cm$^2$ |
| Latex with no glyoxal | 44.7 g/m$^2$ | 31 kg/cm$^2$ |
| Latex with 3% glyoxal | 41.8 g/m$^2$ | 70 kg/cm$^2$ |

What is claimed is:

1. A method for coating a woven substrate, comprising:

(1) applying to said substrate a polymer composition; and (2) drying said substrate containing said polymer composition;

wherein said polymer composition comprises:

(A) a vinyl polymer component present in an amount from 20.0 to 65.0 weight percent, based on the total amount of said backcoating formulation, said vinyl polymer comprising the polymerization product of:

(a) at least one first, copolymerizable α,β-ethylenically unsaturated monomer containing at least one hydroxyl group, present in an amount from 2.0 to 25.0 weight percent based on the total amount of α,β-ethylenically unsaturated copolymerizable monomers;

(b) a second copolymerizable α,β-ethylenically unsaturated monomer containing no hydroxyl groups, present in an amount from 75.0 to 98.0 weight percent, based on the total amount of ethylenically unsaturated copolymerizable monomers; said second monomer comprising:
  (i) 40.0 to 98.0 weight percent, based on the total amount of monomers, of a $C_1$–$C_{18}$ alkyl (meth) acrylate,
  (ii) optionally, up to 40.0 weight percent, based on the total amount of monomers, of a styrenic monomer,
  (iii) optionally, up to 10.0 weight percent, based on the total amount of monomers, of (meth) acrylamide,
  (iv) optionally, up to 20.0 weight percent, based on the total amount of monomers, of (meth) acrylonitrile,
  (v) optionally, up to 20.0 weight percent, based on the total amount of monomers, of an additional copolymerizable monomer, and
  (vi) optionally, up to 2.0 weight percent, based on the total amount of monomers, of a copolymerizable crosslinkable monomer;

(B) a free glyoxal crosslinker component present in an amount from 0.1 to 15.0 weight percent, based on the total amount of component (A);

(C) an additive component present in an amount up to 2.0 weight percent, based on the total amount of component (A); and (D) the remainder of the formulation being a solvent.

2. A method for impregnating a non-woven substrate, comprising:
  (1) applying to said substrate a polymer composition; and
  (2) drying said substrate containing said polymer composition:
wherein said polymer composition comprises:
  (A) a vinyl polymer component present in an amount from 10.0 to 65.0 weight percent, based on the total amount of said backcoating formulation, said vinyl polymer comprising the polymerization product of:
    (a) at least one first, copolymerizable α,β-ethylenically unsaturated monomer containing at least one hydroxyl group, present in an amount from 2.0 to 25.0 weight percent based on the total amount of α,β-ethylenically unsaturated copolymerizable monomers;
    (b) a second copolymerizable α,β-ethylenically unsaturated monomer containing no hydroxyl groups, present in an amount from 75.0 to 98.0 weight percent, based on the total amount of α,β-ethylenically unsaturated copolymerizable monomers; said second monomer comprising:
      (i) 40.0 to 98.0 weight percent, based on the total amount of monomers, of a $C_1$–$C_{18}$ alkyl (meth) acrylate,
      (ii) optionally, up to 40.0 weight percent, based on the total amount of monomers, of a styrenic monomer,
      (iii) optionally, up to 10.0 weight percent, based on the total amount of monomers, of (meth) acrylamide,
      (iv) optionally, up to 20.0 weight percent, based on the total amount of monomers, of (meth) acrylonitrile,
      (v) optionally, up to 20.0 weight percent, based on the total amount of monomers, of an additional copolymerizable monomer, and
      (vi) optionally, up to 2.0 weight percent, based on the total amount of monomers, of a copolymerizable crosslinkable monomer;
  (B) a free glyoxal crosslinker component present in an amount from 0.1 to 15.0 weight percent, based on the total amount of component (A);
  (C) an additive component present in an amount up to 2.0 weight percent, based on the total amount of component (A);
  (D) the remainder of the formulation being a solvent;
  (E) an associative thickener component present in an amount from 0.5 to 10 weight percent, based on the total amount of the backcoating formulation;
  (F) optionally a surfactant component present in an amount up to 10 weight percent, based on the total amount of the formulation of a surfactant;
  (G) optionally, a plasticizer component present in an amount up to 10.0 weight percent based on the total amount of the backcoating formulation; and
  (H) optionally, a filler component present in an amount up to 10.0 weight percent, based on the total amount of the backcoating formulation.

3. A woven substrate coated with a backcoating formulation, comprising:
  (A) a vinyl polymer component present in an amount from 10.0 to 65.0 weight percent, based on the total amount of the polymer composition, said vinyl polymer comprising the polymerization product of
    (a) first, at least one copolymerizable based on the total amount of α,β-ethylenically unsaturated copolymerizable monomers; containing at least one hydroxyl group, present in an amount from 2.0 to 25.0 weight percent, based on the total amount of α,β-ethylenically unsaturated copolymerizable monomers;
    (b) a second copolymerizable α,β-ethylenically unsaturated monomer containing no hydroxyl groups present in an amount from 75.0 to 98.0 weight percent, based on the total amount of α,β-ethylenically unsaturated copolymerizable monomers; said second monomer comprising;
      (i) 40.0 to 98.0 weight percent, based on the total amount of monomers, of a $C_1$–$C_{18}$ alkyl (meth) acrylate,
      (ii) optionally, up to 40.0 weight percent, based on the total amount of monomers, of a styrenic monomer,
      (iii) optionally, up to 10.0 weight percent, based on the total amount of monomers, of (meth) acrylamide,
      (iv) optionally, up to 20.0 weight percent, based on the total amount of monomers, of (meth) acrylonitrile,
      (v) optionally, up to 20.0 weight percent, based on the total amount of monomers, of an additional copolymerizable monomer, and
      (vi) optionally, up to 2.0 weight percent, based on the total amount of monomers, of a copolymerizable crosslinkable monomer;
  (B) a crosslinker component present in an amount from 0.1 to 15.0 weight percent, based on the total amount of component (A)
  (C) an additive component present in an amount up to 2.0 weight percent, based on the total amount of component (A);

(D) a solvent component being the remainder of said polymer composition;

(E) an associative thickener component present in an amount from 0.5 to 10 weight percent, based on the total amount of the backcoating formulation;

(F) optionally, a surfactant component present in an amount up to 10 weight percent, based on the total amount of the formulation of a surfactant;

(G) optionally, a plasticizer component present in an amount up to 10.0 weight percent based on the total amount of the backcoating formulation; and (H) optionally, a filler component present in an amount up to 10.0 weight percent, based on the total amount of the backcoating formulation.

4. A non-woven substrate impregnated with a backcoating formulation, comprising:

(A) a vinyl polymer component present in an amount from 10.0 to 65.0 weight percent, based on the total amount of said backcoating formulation, said vinyl polymer comprising polymerization product of
   (a) first, at least one copolymerizable based on the total amount of $\alpha,\beta$-ethylenically unsaturated copolymerizable monomers; containing at least one hydroxyl group, present in an amount from 2.0 to 25.0 weight percent, based on the total amount of $\alpha,\beta$-ethylenically unsaturated copolymerizable monomers;
   (b) a second copolymerizable $\alpha,\beta$-ethylenically unsaturated monomer containing no hydroxyl groups, present in an amount from 75.0 to 98.0 weight percent, based on the total amount of $\alpha,\beta$-ethylenically unsaturated copolymerizable monomers; said second monomer comprising;
      (i) 40.0 to 98.0 weight percent, based on the total amount of monomers, of a $C_1$–$C_{18}$ alkyl (meth) acrylate,
      (ii) optionally, up to 40.0 weight percent, based on the total amount of monomers, of a styrenic monomer,
      (iii) optionally, up to 10.0 weight percent, based on the total amount of monomers, of (meth) acrylamide,
      (iv) optionally, up to 20.0 weight percent, based on the total amount of monomers, of (meth) acrylonitrile,
      (v) optionally, up to 20.0 weight percent, based on the total amount of monomers, of an additional copolymerizable monomer, and
      (vi) optionally, up to 2.0 weight percent, based on the total amount of monomers, of a copolymerizable crosslinkable monomer; and (B) crosslinker component present in an amount from 0.1 to 15.0 weight percent, based on the total amount of component (A);

(C) an additive component present in an amount up to 2.0 weight percent, based on the total amount of component (A);

(D) a solvent component being the remainder of the formulation;

(E) an associative thickener component present in an amount from 0.5 to 10 weight percent, based on the total amount of the backcoating formulation;

(F) optionally, a surfactant component present in an amount up to 10 weight percent, based on the total amount of the formulation of a surfactant;

(G) optionally, a plasticizer component present in an amount up to 10.0 weight percent based on the total amount of the backcoating formulation; and (H) optionally, a filler component present in an amount up to 10.0 weight percent, based on the total amount of the backcoating formulation.

* * * * *

UNITED STATES PATENT AND TRADEMARK OFFICE
CERTIFICATE OF CORRECTION

PATENT NO. : 5,919,716
DATED : July 6, 1999
INVENTOR(S) : Raynolds et al.

It is certified that error appears in the above-identified patent and that said Letters Patent is hereby corrected as shown below:

Column 15, Line 7:

total amount of $\underline{\alpha,\beta}$-ethylenically

Signed and Sealed this

Eighteenth Day of January, 2000

Attest:

Q. TODD DICKINSON

*Attesting Officer*      *Commissioner of Patents and Trademarks*